United States Patent [19]

Iwamura et al.

[11] Patent Number: 5,099,520
[45] Date of Patent: Mar. 24, 1992

[54] FIGURE RETRIEVAL METHOD

[75] Inventors: Kazuaki Iwamura, Kokubunji; Shigeru Kakumoto, Kodaira; Yasunori Emura, Kokubunji, all of Japan

[73] Assignees: Hitachi Ltd., Tokyo; Hitachi Seiko Ltd., Chiyoda, both of Japan

[21] Appl. No.: 496,181

[22] Filed: Mar. 20, 1990

Related U.S. Application Data

[63] Continuation of Ser. No. 67,013, Jun. 29, 1987, abandoned.

[30] Foreign Application Priority Data

Jun. 27, 1986 [JP] Japan ................. 61-149554

[51] Int. Cl.⁵ .............................................. G06K 9/00
[52] U.S. Cl. ............................................. 382/1; 382/21; 382/22
[58] Field of Search .................. 382/1, 13, 16, 21, 22, 382/23, 24, 25; 364/578, 917.96, 521, 522; 340/747, 748, 750

[56] References Cited

U.S. PATENT DOCUMENTS

| | | | |
|---|---|---|---|
| 4,428,077 | 1/1984 | Shimada et al. | 382/22 |
| 4,496,944 | 1/1985 | Collmeyer et al. | 340/750 |
| 4,628,532 | 12/1986 | Stone et al. | 382/21 |
| 4,653,107 | 3/1987 | Shojima et al. | 382/13 |
| 4,757,312 | 7/1988 | Asai et al. | 340/750 |
| 4,783,829 | 11/1988 | Miyakawa et al. | 382/22 |
| 4,944,034 | 7/1990 | Ohsawa | 364/521 |

FOREIGN PATENT DOCUMENTS 58-117077 7/1983 Japan .

Primary Examiner—David K. Moore
Assistant Examiner—Jose L. Couso
Attorney, Agent, or Firm—Antonelli, Terry, Stout & Kraus

[57] ABSTRACT

A figure retrieval method for storing memory addresses for figure data in an address data table which corresponds to positional coordinates of a multi-dimensional array. When retrieving end points, or node points, other points on a line and points on a surface, these points constituting the figure data, memory addresses for figure data for an object to be retrieved are stored in the address data table and then retrieved. Flags indicative of the kind of the constituent points are also stored in the address data table in combination with the memory addresses and are used for figure retrieval.

41 Claims, 7 Drawing Sheets

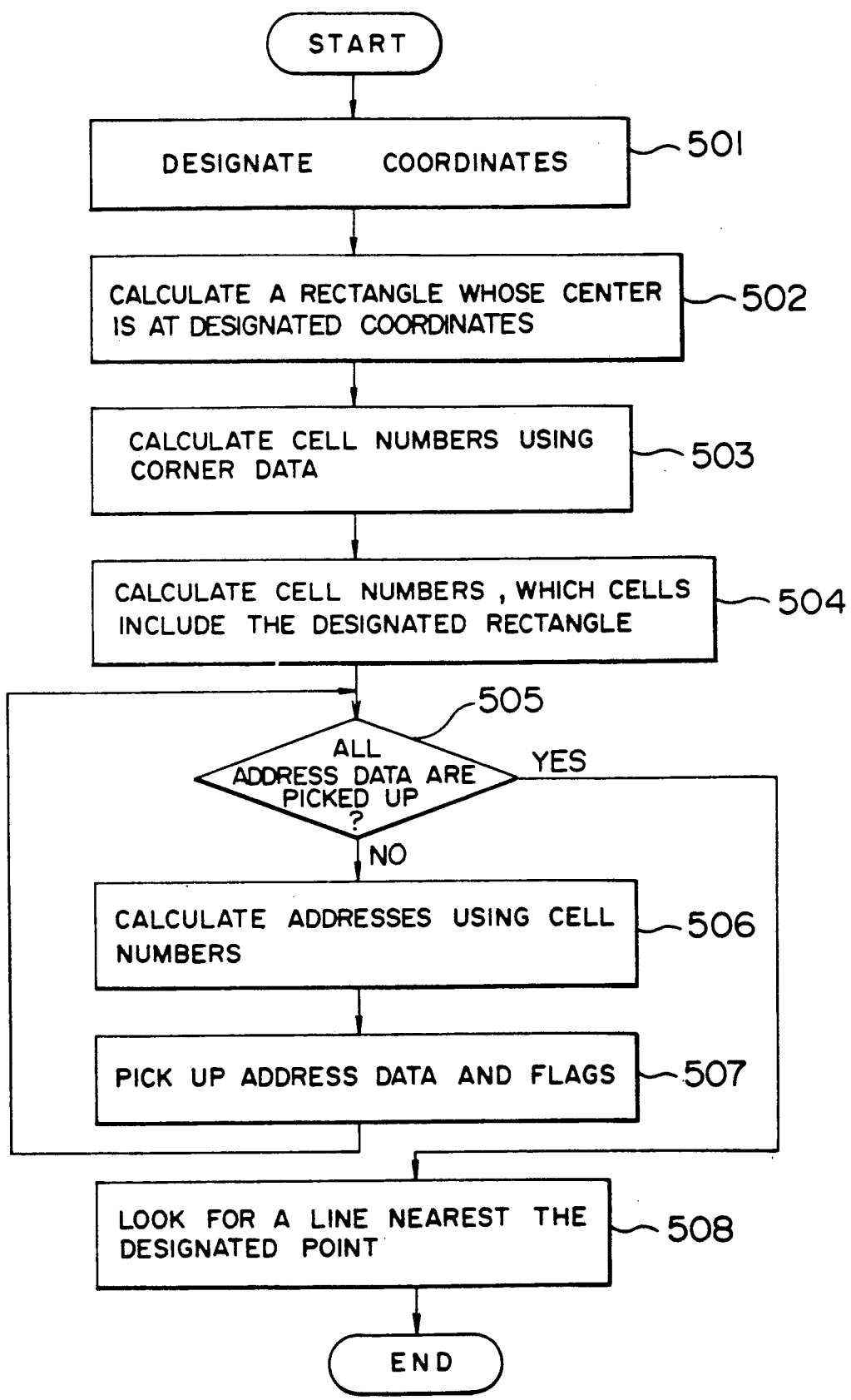

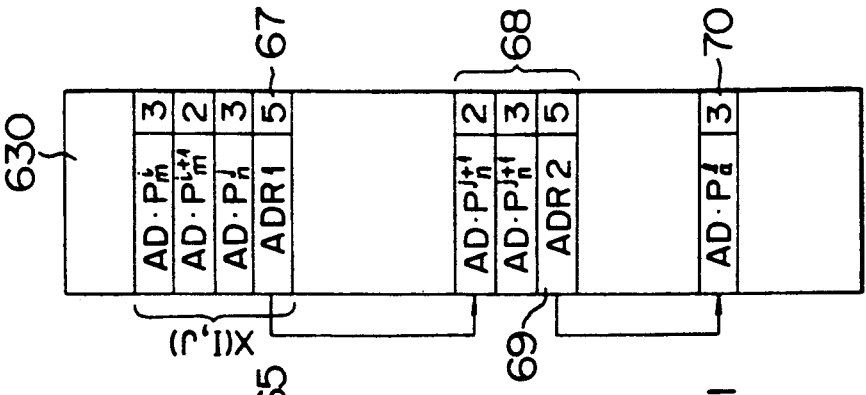
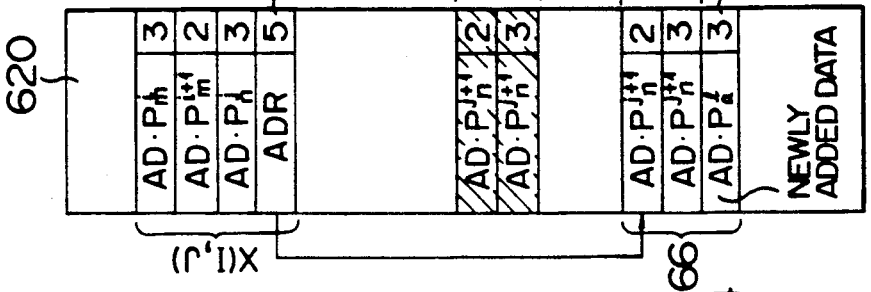
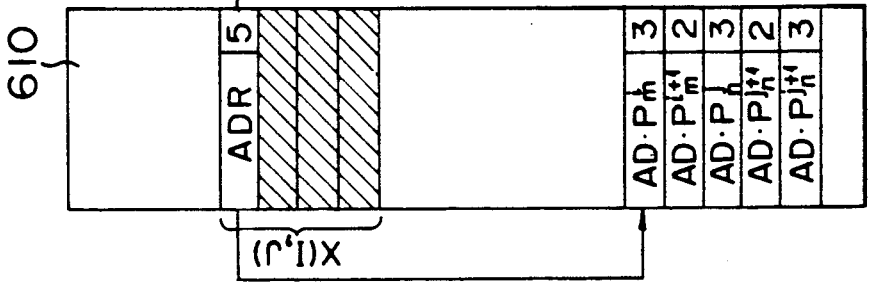
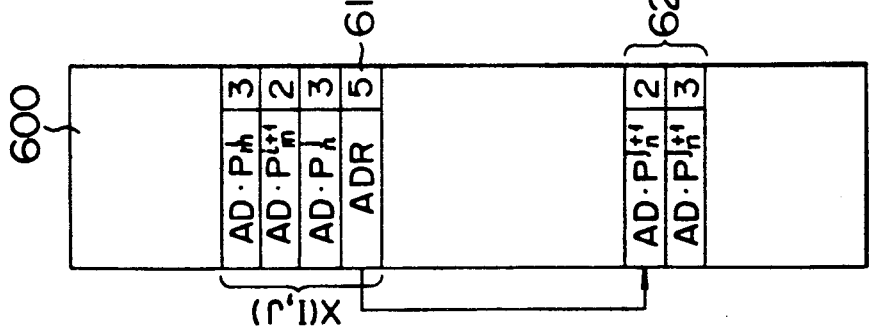

FIGURE RETRIEVAL METHOD

This application is a Continuation of application Ser. No. 07/067,013, filed June 29, 1987 now abandoned.

BACKGROUND OF THE INVENTION

This invention relates to a method of storing figure data inputted to a computer into a memory and retrieving the stored figure data and more particularly, to a figure retrieval method suitable for speed-up of retrieval of figures located at arbitrary positions.

JP-A-58-117077 is related to the present invention and proposes a method which uses two tables for retrieving figures, one being an address data table in which memory addresses for figure data are registered, and the other being a management table for determing the correspondence between a coordinate value representative of each cell which is a subspace of a figure space and a space address on the address data table at which addresses for figures that pass through a cell represented by coordinates is stored.

The prior art method however suffers various disadvantages as described below.

(1) When retrieving an arbitrary figure, it is necessary to consult or look up the management table which has a hierarchial structure of several grades, and this hinders the speed of figure processing.

(2) In order for the known retrieval method to be implemented effectively, addresses for figures contained in each cell have to be stored in the address data table in an orderly manner. Accordingly, when figures are newly added or figures are deleted, address data must be rearranged by sorting them so that addresses for new figures contained in each cell may be stored in an orderly manner.

(3) A figure is constituted by end points, node points and other points on a line. The known method has, however, no ability to selectively retrieve these points. For example, when only a point at a designated position on a line is desired to be retrieved, all of the candidate figures for that point must be retrieved, and thereafter the point sought must be extracted from the retrieved figures, thus degrading efficiency of retrieval.

SUMMARY OF THE INVENTION

An object of this invention is to provide a highly efficient figure retrieval method capable of eliminating the disadvantages of the prior art.

According to the invention, the above object can be accomplished by storing memory addresses for figure data in an address data table which is made to correspond to positional coordinates of a multi-dimensional array. Especially where (i) end points, (ii) node points, (iii) other points on a line and (iv) points on a surface, these elements being figure data, are to be retrieved, highly efficient retrieval can be performed by storing in the address data table only memory addresses for figure data meeting conditions for an object to be retrieved or by storing in the address data table memory addresses and flags corresponding to the respective elements.

In the present invention, the figure data are spatially spread with the figure data table, and the address data table, which is comprised of a multi-dimensional array, is made to correspond to the spatially spread data. Thus, through coordinate transformation between the figure data and the address data table, an arbitrary point on a figure can be made to correspond to an array number (memory area) on the address data table. Memory addresses on a figure data table, at which pieces of the figure data are stored, are stored in the address data table. When retrieving a piece of the figure at an arbitrary position, an array number (memory area) on the address data table is determined on the basis of that position, and the figure being sought can be retrieved by using the figure address stored at the array number (memory area). If memory addresses on the figure data table, at which figure data are stored, are stored in the address data table in combination with flags for the figure data, a specified element, such as a line or a point, can be selectively extracted with high efficiency by checking the flags upon retrieval.

BRIEF DESCRIPTION OF THE DRAWINGS

FIG. 5 is a flow chart showing the figure retrieval argorithm.

FIGS. 6a to 6e are diagrams showing various structures of address data adapted for coping with overflow.

DESCRIPTION OF THE PREFERRED EMBODIMENTS

Figure 1:
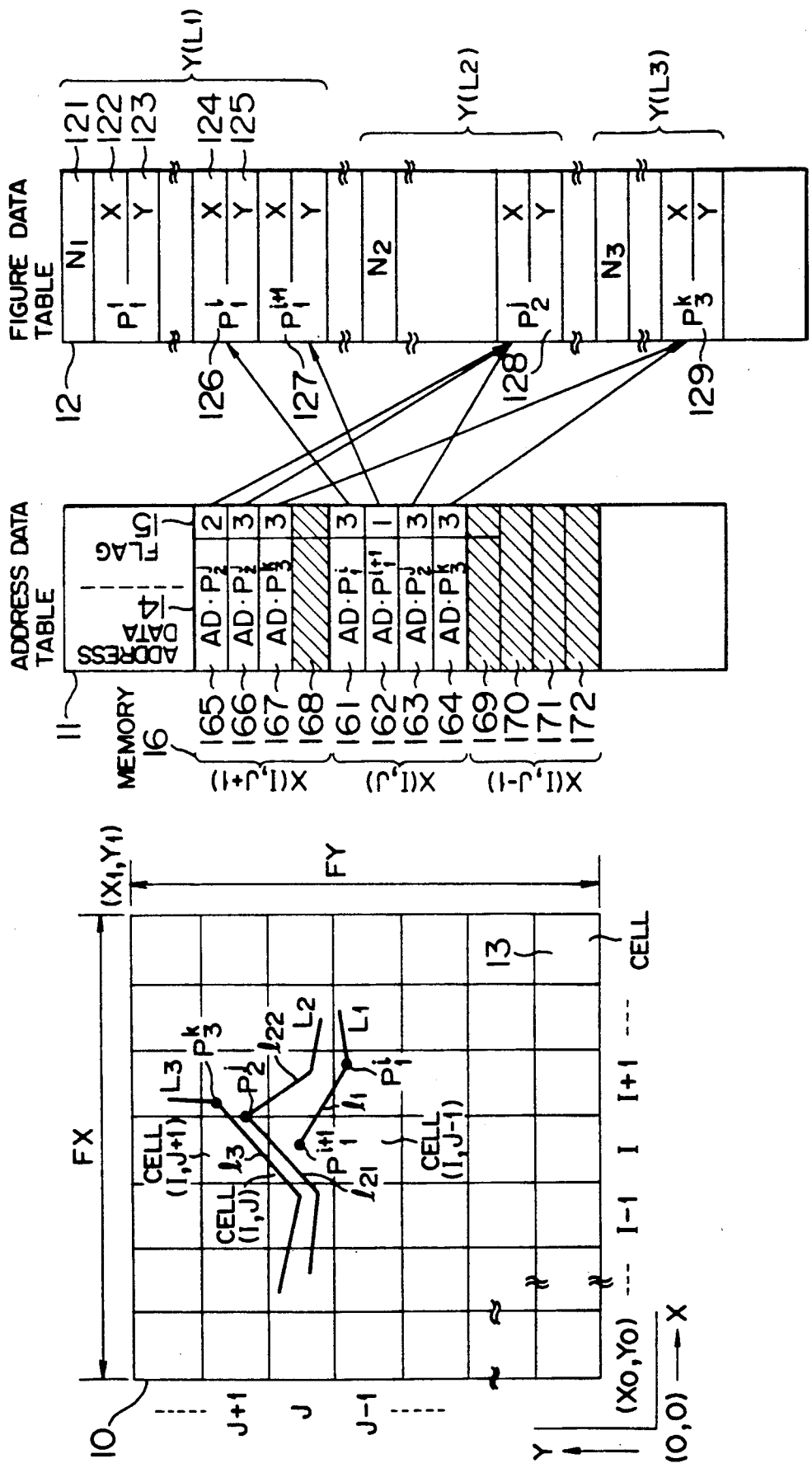
FIG. 1 illustrates the relation between a figure data table and an address data table and the structure of each table.

In the present invention, figure data are stored as will be described with reference to FIG. 1.

Figure 2:
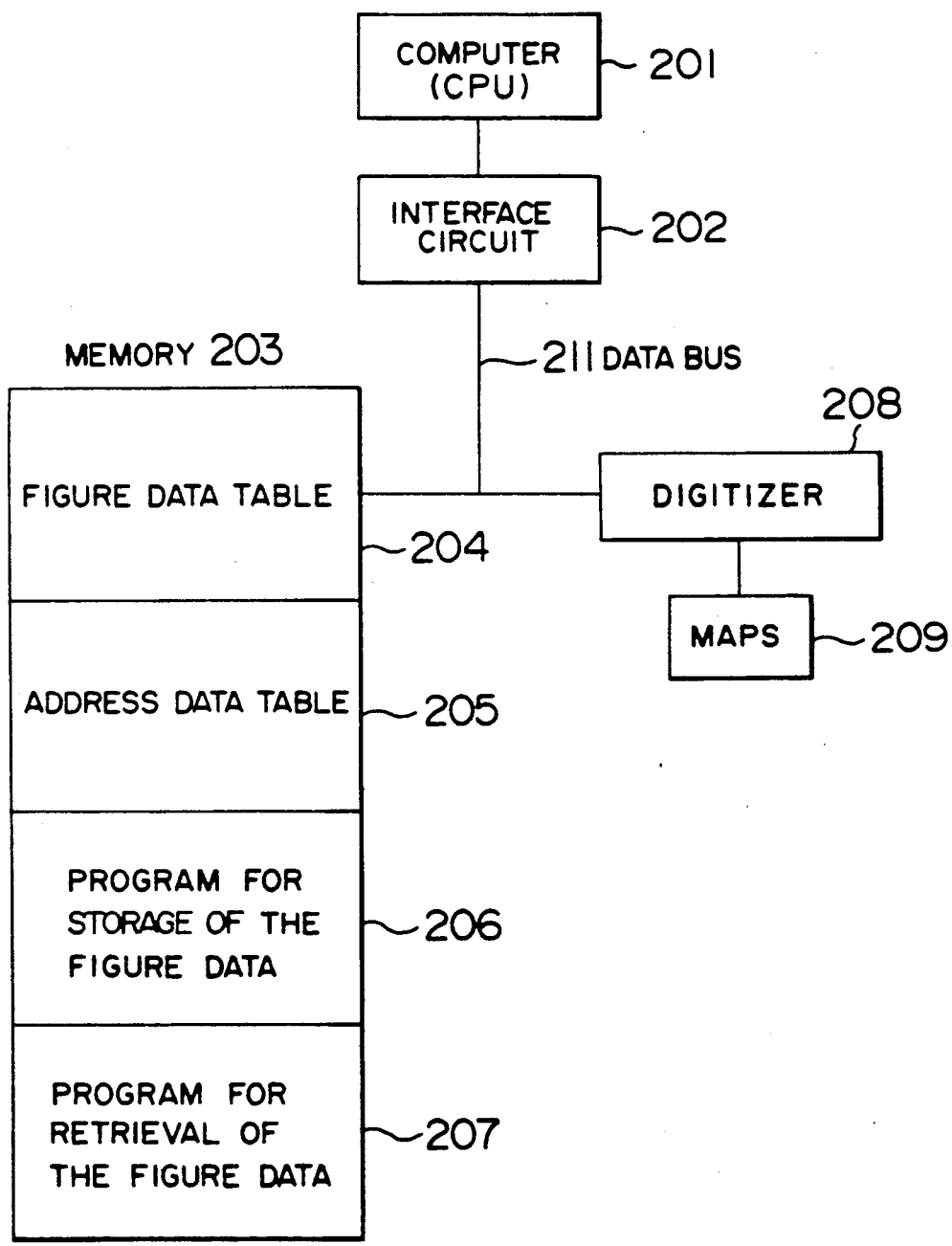
FIG. 2 is a block diagram showing the construction of the hardware used for practicing a figure storage method according to the invention.

The figure data are represented by coordinate values in the present invention, and an address data table 11 in which memory addresses for the figure data are stored, is prepared in a memory (memory 203 in FIG. 2). Also prepared in the memory is a figure data table 12 in which $N_m$ represents the number of points constituting an m-th figure, $P_m^n$ represents an n-th point on the m-th figure, and X and Y described on the right of the $P_m^n$ represent coordinate X and coordinate Y of the $P_m^n$, respectively. In this embodiment, the address data table 11 is so constructed as to meet two dimensional figures as above.

Figures are drawn on a map and exist within a figure space 10. The map spreading two-dimensionally defines Cartesian coordinates having an X abscissa and a Y ordinate starting from the origin 0 (0, 0) as shown in FIG. 1. The figure space 10 is equally divided in the X and Y directions to provide subspaces called cells as designated by reference numeral 13. A cell is represented by a cell number I when counted in the X direction and by a cell number J when counted in the Y direction. The address data table 11 has a memory 16 with a plurality of memory areas each being of a fixed size, and a cell number pair (I, J) is made to correspond to a memory area. The cell number pair (I, J) will hereinafter be simply referred to as cell number (I, J) or cell (I, J). The starting address in each memory area of the memory 16 is calculated using I and J. In respect of all figure data that pass through a cell, memory address data 14 and flags 15 characteristic of the figure data are registered in a corresponding memory area. For example, the flag is "1" to designate (i) an end point, "2" to designate (ii) a node point and "3" to designate (iii) a point on a line. Further, the flag is set to "4" to designate points constituting a surface surrounded by lines. For storage of information indicative of an end point and a node point of a figure, space addresses or memory addresses on the figure data table at which coordinates of the end point and coordinates of the node point, together with flags indicative of the end point and node point, are stored in the memory 16. When information indicative of a point on a line is desired to be stored in combination with the end and node points, a memory address at which a coordinate value of a starting point or an ending point of the line and a flag indicative of the point on the line are stored in the memory 16.

Further, the whole figure can be retrieved by additionally registering in the memory 16 a space address on the figure data table at which $N_m$ is stored (for example, an address of a space 121 on the figure data table 12).

In the figure space 10, a figure $L_1$, a figure $L_2$ and a figure $L_3$ are drawn. These figures are read by a digitizer to be described later, and coordinates X and coordinates Y on the map, representative of individual end points and individual node points associated with each of the figures $L_1$, $L_2$ and $L_3$ are stored figure by figure in the figure data table 12 in combination with $N_m$ indicative of the number of points constituting each figure.

Thus, the figure data table 12 is a table for storing coordinate values of points constituting individual figures and the number of the constituent points. In an area $Y(L_1)$ on the figure data table, the space 121 is for storing the number $N_1$ of points constituting the figure $L_1$, a subspace 122 is for storing the coordinate X of a first end point on the figure $L_1$, a subspace 123 is for storing the coordinate Y of the first end point, a subspace 124 is for storing the coordinate X of an i-th point (node point) $P_i$ on the figure $L_1$, and a subspace 125 is for storing the coordinate Y of the i-th point $P_i$. Accordingly, the coordinate X and the coordinate Y of all the end points and node points on the figure $L_1$ are stored in the area $Y(L_1)$.

Similarly, the number of constituent points and the coordinate X and the coordinate Y of the end points and the node points associated with the figure $L_2$ are stored in an area $Y(L_2)$, and the number of constituent points and the coordinate X and the coordinate Y of the end points and the node points associated with the figure $L_3$ are stored in an area $Y(L_3)$.

The address data table 11 is a table for storing memory addresses on the figure data table 12 cell by cell in combination with information indicative of characteristics of each figure. A memory area $X(I, J)$ corresponds to a cell $(I, J)$ on the figure space 10 and has a fixed size. Since the size of individual memory areas corresponding to individual cells is fixed, addresses for spaces in each memory area can be determined sequentially if the starting address in each memory area is determined from a cell number $(I, J)$. Data regarding figures that pass through the cell $(I, J)$ are all stored in the memory area $X(I, J)$. Each space is divided into a subspace 14 in which memory address data are registered and a subspace 15 in which a flag indicative of characteristics of a figure is registered.

Since a segment $l_1$ constituting a portion of the figure $L_1$ passes through the cell $(I, J)$, memory addresses on the figure data table 12, at which the coordinate X and the coordinate Y of the starting point or the ending point of the segment are stored, are stored in spaces within the memory area $X(I, J)$ on the address data table 11. Flags indicative of characteristics of the figure are also stored in these spaces. A memory address for a space 126 at which coordinates of an i-th point of the figure $L_1$ are stored and a flag "3" indicating that the i-th point is a point on a line are registered in a space 161, a memory address for a space 127 at which coordinates of an (i+1)-th point of the figure $L_1$ are stored and a flag "1" indicating that the (i+1)-th point is an end point are registered in a space 162. A memory address for a space 128 at which a j-th point of the figure $L_2$ is stored and a flag "3" indicating that the j-th point is a point on a line are registered in a space 163. Finally a memory address for a space 129 at which a k-th point of the figure $L_3$ is stored and a flag "3" indicating that the k-th point is a point on a line are registered in a space 164. Within a memory area $X(I, J+1)$ corresponding to a cell $(I, J+1)$, a memory address for the space 128 at which coordinates of the j-th point of the figure $L_2$ are stored and a flag "2" indicating that the j-th point is a node point are registered in a space 165, a memory address for the space 128 at which coordinates of the j-th point of the figure $L_2$ are stored and a flag "3" indicating that the j-th point is a point on a line are registered in a space 166, and a memory address for the space 129 at which coordinates of the k-th point of the figure $L_3$ are stored and a flag "3" indicating that the k-th point is a point on a line are registered in a space 167. The space 168 is vacant. A memory area $X(I, J-1)$, corresponds to a cell $(I, J-1)$. Since no figure passes through the cell $(I, J-1)$, no address data or flags are registered in spaces 169, 170, 171 and 172 within the memory area $X(I, J-1)$. In the address data table 11 shown in FIG. 1, vacant spaces in which no data are registered, are shown as hatched areas. Arrows directed from the address data table 11 to the figure data table 12 prescribe the correspondence relationship between a space in the address data table 11 and a space in the figure data table 12 represented by an address registered at that space in the address data table 11.

The figure data storage described above can be implemented with an apparatus the overall construction of which is illustrated in block form, in FIG. 2. Referring to FIG. 2, a computer (CPU) 201 is coupled with an interface circuit 202 and with a digitizer 208 through a data bus 211. A memory 203 is comprised of a figure data table 204 for storing figure data, an address data table 205 in which memory addresses for the figure data are registered, a program 206 for storage of the figure data and a program 207 for retrieval of the figure data. The programs may be replaced with hardware.

The computer 201 causes the digitizer 208 to store figure data as an object to be processed into spaces on the figure data table within the memory 203. The figure data are described in terms of coordinate values of end points and node points on a polygonal line. The digitizer 208 is activated by the computer 201 to read figures drawn on maps 209. For example, the digitizer 208 comprises a manual digitizer manually operated to generate coordinate data, an automatic digitizer automatically operated for reading or a magnetic tape unit for receiving and delivering through a magnetic tape figures prepared by means of a different system.

When storing figure data, the computer 201 causes the digitizer 208 to read figures drawn on the maps. Subsequently, the computer 201 executes the program 206 for storage of the figure data, with the result that the figure data read by the digitizer are stored in areas of the figure data table 204 and addresses for spaces, at which the figure data are stored, are stored in memory areas of the address data table 205. When retrieving the figure data, the computer 201 executes the program 207 for retrieval of the figure data so that the figure data stored in areas of the figure data table 204 are retrieved by consulting memory areas of the address data table 205.

Figure 3A:
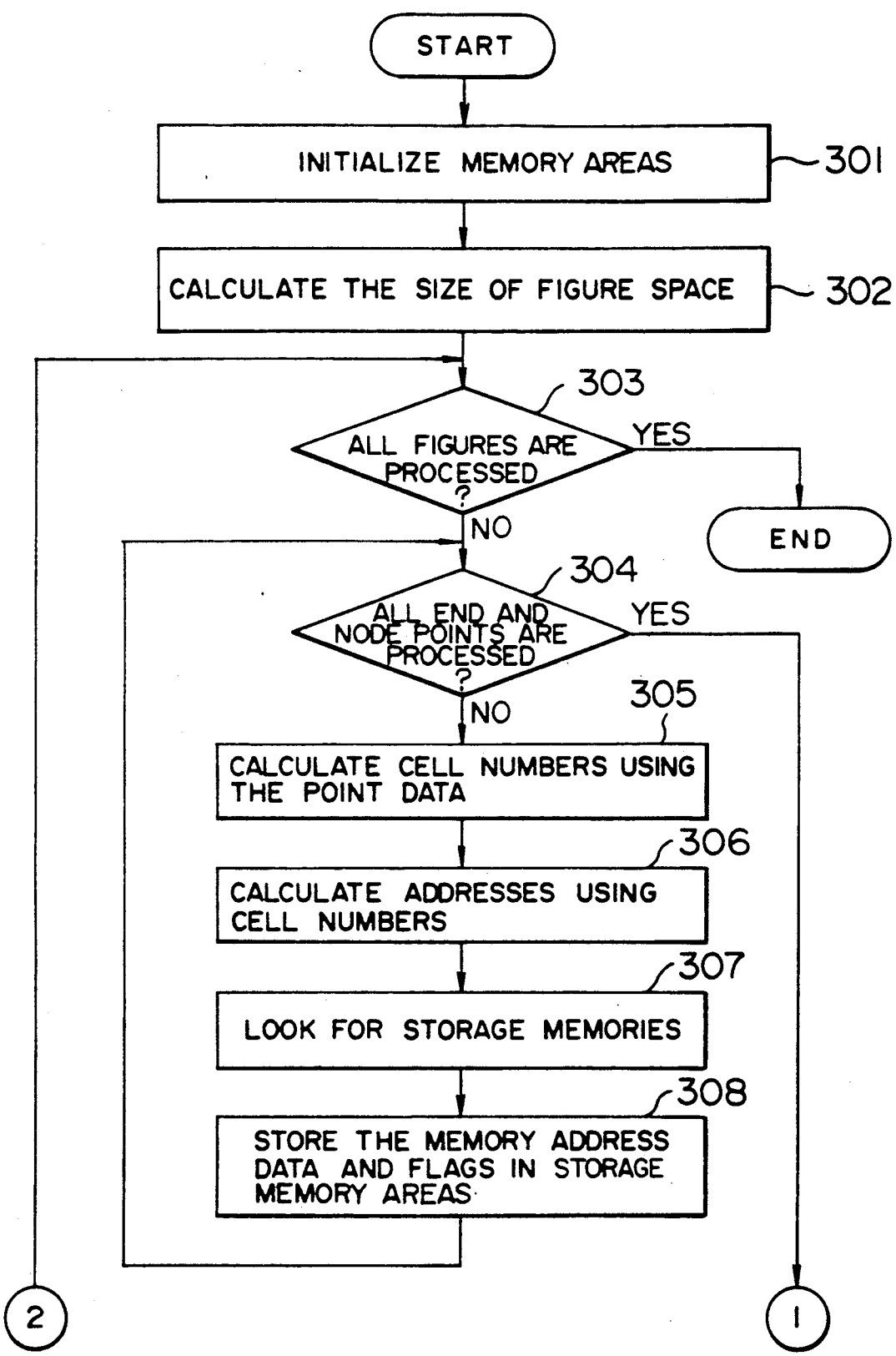
FIGS. 3a and 3b are flow charts showing the figure storage argorithm.
Figure 3B:
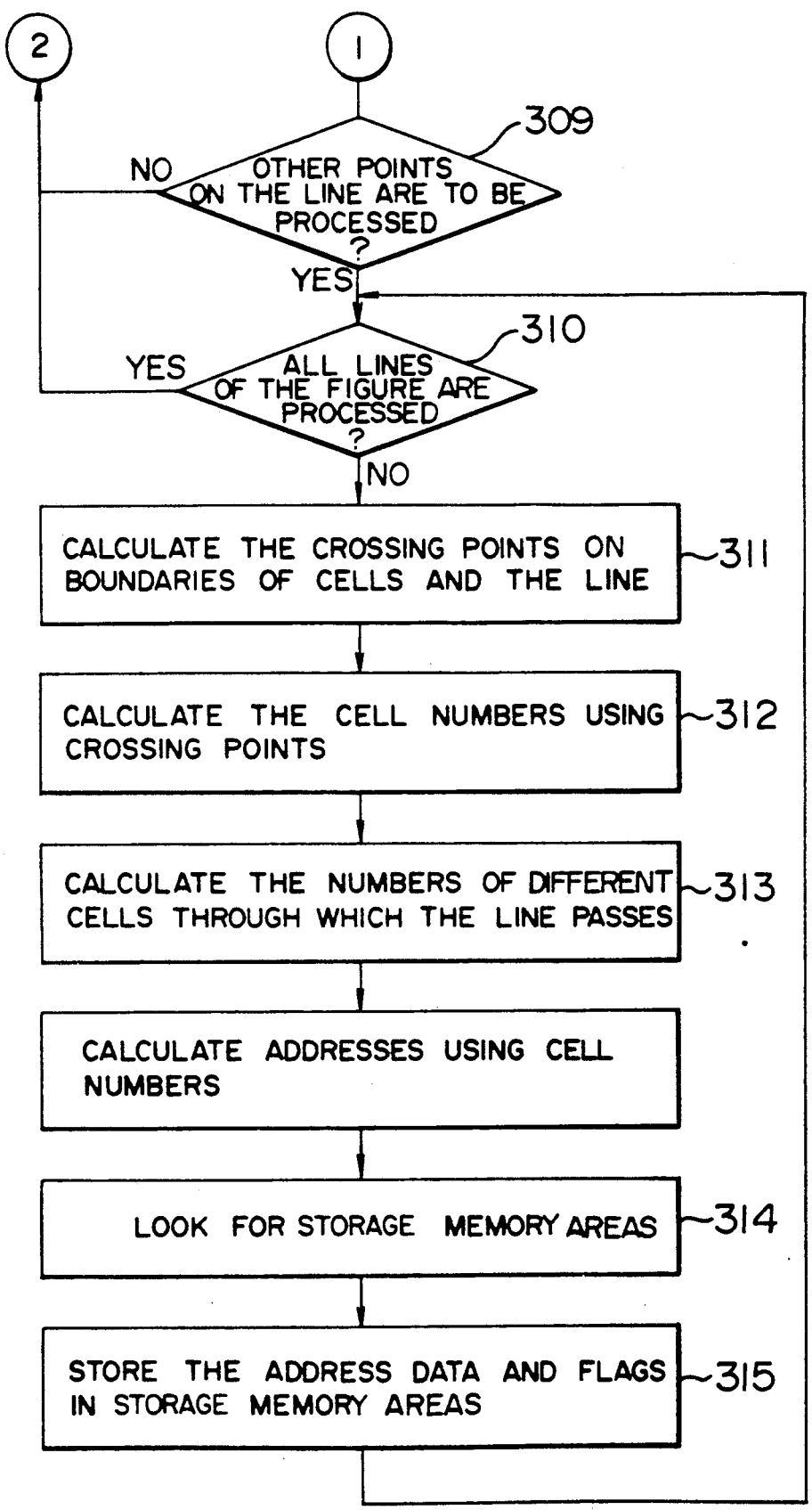

The address data table is prepared in accordance with the algorithm shown in FIGS. 3a and 3b. All memory areas of the address data table are first initialized to, for example, a value of "0" (step 301). Subsequently, coordinate values in the X direction are compared with each other and coordinate values in the Y direction are also compared together by consulting all of figure data to obtain maximum and minimum coordinate values in the X and Y directions, whereby the size of figure space is calculated which is defined by an X-direction length FX equalling the difference between the maximum and minimum coordinate values in the X direction and a Y-direction length FY equalling the difference between the maximum and minimum coordinate values in the Y direction (step 302). Thereafter, by consulting coordinate values of end points and node points of individual figures represented by the figure data, memory addresses from the figure data table at which coordinate values of the end points and node points are stored are registered, together with flags, in the memory 16 of the address data table 11 with the memory addresses registered in address subspaces and the flags registered in flag subspaces.

More particularly, coordinates (X, Y) are first converted into a corresponding cell number (I, J) pursuant to the following coordinate transformation formula (step 305):

$$I = [X \times AX/FX] \qquad (1)$$
$$J = [Y \times AY/FY].$$

In equation (1), FX represents the X-direction length of the figure space, FY the Y-direction length of the figure space. AX the number by which the figure space is divided in the X direction, AY the number by which the figure space is divided in the Y direction, and [ ] the Gaussian notation which defines a maximum integer that does not exceed a number described in [ ]. Then, memory addresses for figure data are registered in the memory area X(I, J) of memory 16 corresponding to the cell number (I, J). The memory area X(I, J) has a fixed size. The memory area has an array of spaces which may be represented by (I, J, K), where K ranges from 1 (one) to a numeral indicative of the number of data that are permitted to be registered in the memory area of the memory 16. The starting address ADR in a memory area of memory 16 in which memory addresses for figure data are registered can be calculated from $$ADR = AY \times DP \times NB \times i + NB \times DP \times j + FST\$AD \qquad (2)$$

where DP represents the number of data that are permitted to be stored in the memory area, NB the size of the memory area in which memory addresses and flags for figure data of one cell are stored, and FST$AD the starting address of the address data table. Assuming that $AY = 2^m$, $DP = 2^n$ and $NB = 2^l$, equation (2) is rewritten as:

$$ADR = i \times 2^{m+n+l} + j \times 2^{n+l} + FST\$AD \qquad (3)$$

Since a power of 2 can be calculated through shift operations, equation (3) is suitable for computer processings.

Addresses in the memory area are calculated pursuant to equation (2) or (3) (step 306), and memory addresses and flags for figure data are stored in spaces within the memory area (step 308). If the memory area of the array (I, J, K) is filled up with data, a different memory area is searched for by changing the array to (I, J, K+1),(I, J, K+2) . . . (step 307). A selected memory area which has been initialized to "0" can afford to store the surplus data. The above processing is repeated to process all of end points and node points (step 304).

Further, when points on a line excepting end points and node points are to be registered in the address data table (step 309), crossing points at which a line of a figure crosses a boundary of a cell are first calculated (step 311). More specifically, it is decided which of the vertical segments or horizontal segments of the boundary of the cell the line crosses. To this end, a circumscribing rectangle is assumed which has a diagonal line coincident with the line, two X-direction parallel sides of a length of DX and two Y-direction parallel sides of a length of DY. If $DX \geq DY$, the vertical segments of the boundary of the cell are selected for calculation of crossing points. If $DX < DY$, the horizontal segments of the boundary of the cell are selected for calculation of crossing points. The thus calculated crossing points are converted into a cell number (I, J) containing the crossing points by using equation (1) (step 312). For $DX \geq DY$, J is temporarily stored and for $DX < DY$, I is temporarily stored. When vertical segments of a boundary are subsequently selected, the previously stored J' is called up and a cell number (I", J") is calculated (step 313) which satisfies $$I'' = I$$

if $J < J'$, $J \leq J'' < J'$ if $J' < J$, $J' < J'' \leq J$.

Similarly, when horizontal segments of a boundary are subsequently selected, the previously stored I' is called up and a cell number (I", J") is calculated which satisfies $$J'' = J$$

if $I < I'$, $I \leq I'' < I'$ if $I' < I$, $I' < I'' \leq I$.

The thus calculated cell number (I", J") is substituted into equation (2) or (3) to obtain the corresponding address for a space of the address data table (step 314) and a memory address for the figure data and flags indicative of the points on the line are stored in the corresponding memory area of the memory 16 (step 315). In this manner, memory addresses for figure data and flags indicative of other points on the line than end and node points can be stored in the address data table 11 corresponding to all cells through which the line passes.

The above processing is repeated for all lines of the figures (step 310). Memory addresses and flags for all figures are stored in the address data table (step 303). If functions are additionally provided in step 303 to decide color and size of figures and to selectively store specified candidates for, for example, only end points, only end and node points or only points on a surface, an address data table can be prepared which is available for the specified information. The above algorithm may also be applied to addition or deletion of figures. Especially, for deletion of figures, memory addresses and flags are not stored in the memory 16 but are erased therefrom. Obviously, the whole of the address data table need not be renewed for both addition and deletion of figures.

Figure 4B:
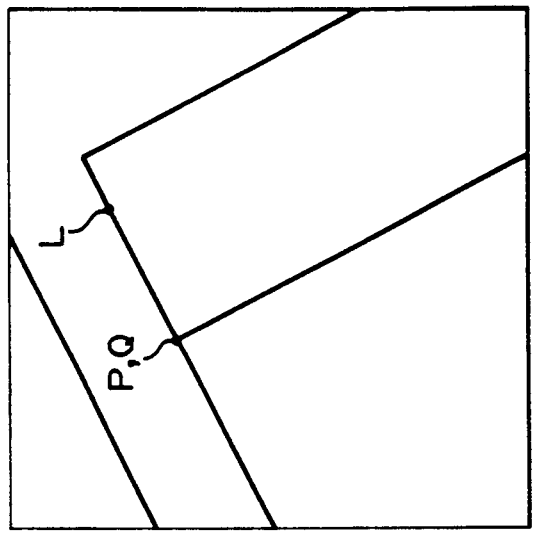
FIGS. 4a and 4b are diagrams useful in explaining a T-shape connection process.
Figure 4A:
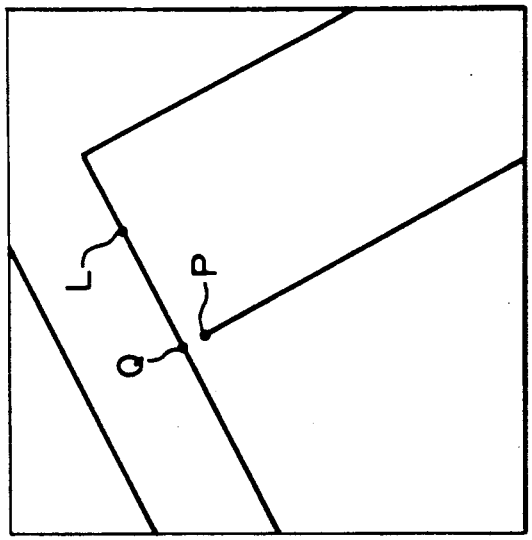

This figure processing method using the address data table can be applied to a T-shape connection process as shown in FIGS. 4a and 4b. In this process, a line L lying in close proximity of an end point P within a designated range, excepting a line which contains by itself the point P, is selected and the point P is drawn to the line L to lie thereon. Firstly, in this process, an address data table is prepared for end points, node points and other points on the line. Thereafter, a program for figure retrieval stored in the area of the program for retrieval of the figure data is executed. The algorithm for figure retrieval is shown in FIG. 5.

Referring to FIG. 5, coordinates of P are first designated (step 501). A window area for the search operation is set around the point P (step 502). Coordinates of the left lower corner and right upper corner of the window area are converted into cell numbers pursuant to equation (1) (step 503). By consulting the cell numbers determined in step 503, cell numbers inside the window area are calculated (step 504), and starting addresses on the address data table corresponding to these cell numbers inside the window area are calculated using equation (2) or (3) (step 506). Beginning with each designated starting address, memory spaces within each memory area are swept until a vacant space (stored with initial value "0") is found, thereby picking up memory addresses and flags for the figure stored in the memory 16 (step 507). Processings enacted by steps 506 and 507 are carried out for all the cells inside the window area (step 505). On the basis of the memory addresses and flags for the figure, corresponding lines on the figure space are extracted, and distances between the point P and the extracted lines are calculated to select a line nearest the point P (step 508). A crossing point Q at which the selected line crosses the line containing the point P is calculated and the coordinates of the point P are shifted to coordinates of the crossing point Q.

The method described so far can be applied to an address data table adapted for three-dimensional figures by increasing the order of the array (I, J, K).

In some applications, the number of figure data pieces is so large that memory address data for the figure data can not be stored in a prepared memory of fixed size. In that case, memory address data are stored in various ways as will be described with reference to FIGS. 6a to 6e. Illustrated in FIG. 6a are figures which pass through a cell (I, J). Specifically, through the cell (I, J) a figure $L_n$ passes, having a j-th point $P_n^j$ (a point on a line) and a (j+1)-th point $P_n^{j+1}$ (a node point) and a figure $L_m$ passes having an i-th point $P_m^i$ (a point on a line) and an (i+1)-th point $P_m^{i+1}$ (a node point). A figure $L_a$, illustrated as a dotted line in FIG. 6a, is a newly added figure having an l-th point (a node point).

When memory address data are excessive for storage, surplus data may be stored in an address data table 600 in a way as exemplified in FIG. 6b. A memory area X(I, J) corresponds to a cell (I, J). A flag of value "5" indicative of overflow of memory address data is stored in a subspace of one space 61 within the memory area X(I, J), and surplus memory address data overflown from the memory area X(I, J) are sequentially stored in a memory area 62 designated by an address in the space 61. In an address data table 610 illustrated in FIG. 6c, an address and a flag "5" indicative of overflow are stored in subspaces of a starting space 63 within a memory area X(I, J), and memory address data stored in the memory area X(I, J), together with newly added memory address data, are shifted to a memory area 64 designated by the address in the space 63. By controlling storage of memory address data into the memory in this manner, the application of the method of the invention can be extended to cells in which figure data exist with a higher density. In an address data table 620 shown in FIG. 6d, memory address data overflown from a memory area X(I, J) are shifted to a new memory area 66, along with memory address data 71 newly added to the memory area X(I, J). The new memory area 66 can be designated by an address in a space 65 within the memory area X(I, J). In an address data table 630 shown in FIG. 6e, memory address data overflow from a memory area X(I, J) are stored in a memory area 68 designated by an address in a space 67 within the memory area X(I, J), and newly added memory address data are stored in a space 70 designated by an address in a space 69 within the memory area 68, thereby ensuring sequential storage of newly added memory address data for figures. As is clear from the foregoing discussion, the figure storage method of the invention can be extended in various ways and practiced in many applications.

According to the method of the present invention, memory addresses for figure data are registered in a specified memory area on the address data table designated by an address calculated pursuant to equations (1) and (2) or (3) and figures are retrieved by looking up only figure data registered in the specified memory area. Accordingly, unlike the prior art method, the present method does not require consulting the whole figure and the special table for managing memory address data, thereby attaining a speed-up of figure retrieval. Further, for addition or deletion of figures, the address data table need not be renewed. In addition, particular points on the figure can be retrieved selectively by using flags.

We claim:

1. A figure retrieval system comprising:
    a source of digitized figure data describing in coordinate values end points and node points of a figure within a figure space;
    means for dividing the figure space into cells, each cell being identified by a cell number;
    means defining a figure data table for storing the figure data;
    means defining an address data table, having individual memory areas of fixed size and corresponding to the cells, for storing within each individual memory area cell information for all figures passing through the corresponding cell, the cell information including memory address information for the corresponding figure data stored in the figure data table;
    retrieval means for identifying cells within a window area of the figure space for a search operation for figure data, reading out information corresponding to the identified cells from the address data table, and reading out figure data from said figure data table on the basis of the read out information, whereby, when the figure is modified, modifying the figure data, any additional figure data resulting from the modification can be stored in available storage spaces of the figure data table, with the addresses of those storage spaces within the figure data table that are storing the additional figure data stored in the memory areas of the address data table corresponding with the figure space cells having modified figure data, so that the address data table does not need to be entirely rearranged.

2. A figure retrieval system as claimed in claim 1 wherein said address data table memory areas further store flag information indicative of a characteristic of the figure data within the associated cells.

3. A figure retrieval method, for retrieving a figure presented within a figure space having Cartesian coordinates with an X abscissa and a Y ordinate from an origin and being divided in the X and Y directions into cells, the method utilizing a figure data table including a plurality of storage spaces, each storage space having an address, and an address data table having a plurality of memory areas of fixed size, one memory are corresponding with each figure space cell, said method comprising the steps of:

(a) digitizing a figure within the figure space to provide figure data including coordinates of each points and node points of the figure within the figure space;

(b) storing the figure data in storage spaces of the figure data table;

(c) in the memory areas of the address data table corresponding with figure space cells having therein end points and node points of the digitized figure, storing the addresses of those storage spaces within the figure data table that are storing the corresponding figure data for the digitized figure; and (d) retrieving figures within a designated portion of the figure space on the basis of memory address data stored in the address data table, whereby, when the figure is modified, modifying the figure data, any additional figure data resulting from the modification can be stored in available storage spaces of the figure data table, with the addresses of those storage spaces within the figure data table that are storing the additional figure data stored in the memory areas of the address data table corresponding with the figure space cells having modified figure data, so that the address data table does not need to be entirely rearranged.

4. A figure retrieval method according to claim 3 further comprising storing in the address data table information designating characteristics of the figure data for the corresponding figure space cell.

5. A figure retrieval method according to claim 3 wherein step (c) comprises:

determining the size of the figure space by calculating minimum coordinate values and maximum coordinate values along the abscissa and the ordinate for the figure data by detecting the range of values of the figure data in the figure data table;

assigning cell numbers to the figure space cells;

converting coordinates of the digitized figure into the corresponding cell numbers; and searching for vacant memory areas in the address data table to store therein the memory address data.

6. A figure retrieval method according to claim 3 further comprising storing in a first memory area of the address data table and address indicative of a second memory area of the address data table and information indicative of overflow of data; and storing in the second memory area surplus memory addresses from the first memory area.

7. A figure retrieval method as claimed in claim 3 wherein:

step (a) further provides figure data including data identifying coordinates of portions of a figure passing through figures space cells; and step (c) includes storing, in memory areas of the address data table corresponding with figure space cells through which the digitized figure passes, the addresses of those storage spaces within the figure data table that are storing the corresponding figure data for the digitized figure.

8. A figure retrieval method according to claim 3 further comprising storing in said corresponding memory area information indicative of overflow of data; identifying a second memory area having a predetermined relationship with said corresponding memory area; and storing in the second memory area surplus addresses from said corresponding memory area.

9. A figure retrieval method according to claim 8 wherein the predetermined relationship is defined by an address indicative of the second memory area, and said method further comprises storing the address of the second memory area in said corresponding memory area.

10. A figure retrieval method, for retrieving a figure presented within a figure space having Cartesian coordinates with an X abscissa and a Y ordinate from an origin, the method utilizing a figure data table having storage spaces and an address data table having individual memory areas of fixed size, said method comprising the steps of:

(a) dividing the figure space in the X and Y directions into cells, each cell corresponding with one of the individual memory areas and being identified by a cell number;

(b) digitizing a figure within the figure space to provide digitized figure data, including X and Y coordinate information for end points and node points of the figure;

(c) storing the figure data in storage spaces of the figure data table;

(d) in those memory areas of the address data table corresponding with figure space cells having therein end points and node points of the digitized figure, storing the addresses of the figure data table storage spaces in which the corresponding figure data is stored; and (e) retrieving figures within a designated portion of the figure space on the basis of memory address data stored in the address data table, whereby, when the figure is modified, modifying the figure data, any additional figure data resulting from the modification can be stored in available storage spaces of the figure data table, with the addresses of those storage spaces within the figure data table that are storing the additional figure data stored in the memory areas of the address data table corresponding with the figure space cells having modified figure data, so that the address data table does not need to be entirely rearranged.

11. A figure retrieval method according to claim 10 further comprising storing in the address data table flag information indicative of a characteristic of the figure data for the corresponding figure space cell.

12. A figure retrieval method according to claim 10 wherein step (a) comprises dividing the figure space into $2^n$ cells, where n is an integer.

13. A figure retrieval method according to claim 10 wherein the step (d) comprises:
 initializing the memory areas of the address data table;
 determining the size of the figure space by calculating minimum and maximum coordinate values along the abscissa and the ordinate for the figure data by detecting the range of values of the figure data in the figure data table;
 storing in the memory areas of the address data table corresponding with the figure space cells in which the end points and node points of the figure are located memory addresses from the figure data table at which coordinate values of the end points and node points of the figure are stored.

14. A figure retrieval method according to claim 13 wherein step (d) further comprises determining the cell numbers of cells containing the end points and node points, utilizing the formulae $I = X_i \cdot AX/FX$ and $J = Y_i \cdot AY/FY$, where I is the X direction cell number of a cell containing a point, J is the Y direction cell number of the cell containing the point, $X_i$ is the X direction coordinate of the point, $Y_i$ is the direction coordinate of the point, AX is the X direction cell length, AY is the Y direction cell length, FX is the X direction figure length, and FY is the Y direction figure length.

15. A figure retrieval method according to claim 10 wherein step (d) comprises:
 defining a rectangular window area of the figure space for a search operation for figure data;
 ascertaining the coordinates of two diagonally opposite corners of the defined window area with respect to the X abscissa and the Y ordinate;
 converting the ascertained coordinates into cell number, utilizing the formula $I = X_i \cdot AX/FX$ and $J = Y_i \cdot AY/FY$, where I is the X direction cell number of a cell containing a point, J is the Y direction cell number of the cell, $X_i$ is the X direction coordinate of the point, $Y_i$ is the Y direction coordinate of the point, AX is the X direction cell length, AY is the Y direction cell length, FX is the X direction figure length, and FY is the Y direction figure length;
 determining cell numbers within the window area;
 for each determined cell number, determining a starting address in the address data table;
 commencing at each determined starting address, examining sequential memory areas within the address data table until a vacant memory area is located, thereby determining memory addresses of storage spaces within the figure data table from which stored figure data is to be retrieved.

16. A figure retrieval method as claimed in claim 10, wherein step (d) comprises:
 identifying cells corresponding with the designated portion of the figure space;
 interrogating the memory areas of the address data table corresponding to the identified cells to obtain the addresses of the figure data table storage spaces in which the corresponding figure data is stored;
 interrogating the figure data table storage spaces for which addresses were obtained to obtain the figure data stored therein; and displaying the figure corresponding with the obtained figure data.

17. A figure retrieval method according to claim 10 further comprising storing in said corresponding memory area information indicative of overflow of data; identifying a second memory area having a predetermined relationship with said corresponding memory area; and storing in the second memory area surplus addresses from said corresponding memory area.

18. A figure retrieval method according to claim 17 wherein the predetermined relationship is defined by an address indicative of the second memory area, and said method further comprises storing the address of the second memory area in said corresponding memory area.

19. A figure retrieval system, for retrieving a figure presented within a figure space having Cartesian coordinates with an X abscissa and a Y ordinate from an origin and being divided in the X and Y directions into cells, the system comprising:
 means defining a figure data table including a plurality of storage spaces, each storage space having an address;
 means defining an address data table having a plurality of memory areas of fixed size, one memory area corresponding with each figure space cell;
 means for digitizing a figure within the figure space to provide figure data including coordinates of end points and node points of the figure within the figure space;
 first storage means for storing the figure data in said figure data table;
 second storage means for storing, in the memory areas of said address data table corresponding with figure space cells having therein end points and node points of the digitized figure, the addresses of those storage spaces within said figure data table that are storing the corresponding figure data for the digitized figure; and
 means for retrieving figures within a designated portion of the figure space on the basis of memory address data stored in said address data table,
 whereby, when the figure is modified, modifying the figure data, any additional figure data resulting from the modification can be stored in available storage spaces of the figure data table, with the addresses of those storage spaces within the figure data table that are storing the additional figure data stored in the memory areas of the address data table corresponding with the figure space cells having modified figure data, so that the address data table does not need to be entirely rearranged.

20. A figure retrieval system according to claim 19 further comprising means for storing in the address data table information designating characteristics of the figure data.

21. A figure retrieval system according to claim 19 wherein said second storage means comprises:
 means for determining the size of the figure space by calculating minimum coordinate values and maximum coordinate values along the abscissa and the ordinate for the figure data by detecting the range of values of the figure data in the figure data table;
 means for assigning cell numbers to the figure space cells;
 means for converting coordinates of pieces of the figure data into the corresponding cell numbers; and means for searching for vacant memory areas in the address data table to store therein the memory address data.

22. A figure retrieval system according to claim 19 further comprising means for storing in a first memory area of the address data table an address indicative of a second memory area of the address data table and information indicative of overflow of data; and means for storing in the second memory area surplus memory addresses from the first memory area.

23. A figure retrieval system as claimed in claim 19, wherein:
said digitizing means further provides figure data including data identifying coordinates of portions of a figure passing through figure space cells; and
said second storage means further stores, in memory areas of the address data table corresponding with figure space cells through which the digitized figures passes, the addresses of those storage spaces within the figure data table that are storing the corresponding figure data for the digitized figure.

24. A figure retrieval system, for retrieving a figure presented within a figure space having Cartesian coordinates with an X abscissa and a Y ordinate from an origin and being divided in the X and Y directions into cells, the system comprising:
means defining a figure data table including a plurality of storage spaces, each storage space having an address;
means defining an address data table having a plurality of memory areas of fixed size, each memory area corresponding with one of the figure space cells;
means for digitizing a figure within the figure space to provide digitized figure data, including X and Y coordinate information for end points and node points of the figure;
means for storing the figure data in storage spaces of said figure data table;
means for storing, in those memory areas of said address data table cell corresponding with figure space cells having therein end points and node points of the digitized figure, the addresses of figure data table storage spaces in which the corresponding figure data is stored; and
means for retrieving figures within a designated portion of the figure space on the basis of memory address data stored in the address data table,
whereby, when the figure is modified, modifying the figure data, any additional figure data resulting from the modification can be stored in available storage spaces of the figure data table, with the addresses of those storage spaces within the figure data table that are storing the additional figure data stored in the memory areas of the address data table corresponding with the figure space cells having modified figure data, so that the address data table does not need to be entirely rearranged.

25. A figure retrieval system as claimed in claim 24 further comprising means for storing in the address data table flag information indicative of a characteristic of the figure data for the corresponding figure space cell.

26. A figure retrieval system as claimed in claim 24, wherein said retrieving means comprises:
means for interrogating the memory areas of the address data table corresponding to figure spaces cells within the designated portion of the figure space to obtain the addresses of the figure data table storage spaces in which the corresponding figure data is stored;
means for interrogating the figure data table storage spaces for which addresses were obtained to obtain the figure data stored therein; and
means for displaying the figure corresponding with the obtained figure data.

27. A figure storage method, for storing a representation of a figure presented within a figure space having Cartesian coordinates with an X abscissa and a Y ordinate from an origin and being divided in the X and Y directions into cells, the method utilizing a figure data table including a plurality of storage spaces, each storage space having an address, and an address data table having a plurality of memory areas of fixed size, each memory area corresponding with one of the figure space cells, said method comprising the steps of:
(a) digitizing a figure within the figure space to provide figure data, including X and Y coordinate information for end points and node points of the figure within the figure space;
(b) storing the figure data in storage spaces of the figure data table; and
(c) in the memory areas of the address data table corresponding with figure space cells having therein end points and node points of the digitized figure, storing addresses of those storage spaces within the figure data table that are storing figure data for the digitized figure,
whereby, when the figure is modified, modifying the figure data, any additional figure data resulting from the modification can be stored in available storage spaces of the figure data table, with the addresses of those storage spaces within the figure data table that are storing the additional figure data stored in the memory areas of the address data table corresponding with the figure space cells having modified figure data, so that the address data table does not need to be entirely rearranged.

28. A figure storage method as claimed in claim 27, wherein:
step (a) further provides figure data including data identifying coordinates of portions of a figure passing through figures space cells; and
step (c) includes storing, in memory areas of the address data table corresponding with figure space cells through which the digitized figure passes, the addresses of those storage spaces within the figure data table that are storing the corresponding figure data for the digitized figure.

29. A method as claimed in claim 27, further utilizing a display device, said method further comprising:
interrogating the memory areas of the address data table corresponding with figure space cells having therein end points and node points of a figure to be retrieved to obtain the addresses of the storage spaces within the figure data table in which the corresponding figure data is stored;
interrogating the storage spaces for which addresses were obtained to obtain the coordinates of the end points and node points of the figure data stored therein;
applying the obtained coordinates to the display device to display the end points and node points of the figure to be retrieved; and
joining the displayed end points and node points to display the retrieved figure.

30. A figure storage method according to claim 27 further comprising storing in said corresponding memory area information indicative of overflow of data; identifying a second memory area having a predetermined relationship with said corresponding memory area; and storing in the second memory area surplus addresses from said corresponding memory area.

31. A figure storage method according to claim 30 wherein the predetermined relationship is defined by an address indicative of the second memory area, and said method further comprises storing the address of the second memory area in said corresponding memory area.

32. A figure storage method, for storing a representation of a figure presented within a figure space having Cartesian coordinates with an X abscissa and a Y ordinate from an origin, the method utilizing a figure data table having storage spaces and an address data table having individual memory areas of fixed size, said method comprising the steps of:
dividing the figure space into cells, each cell corresponding with one of the individual memory areas and being identified by a cell number;
digitizing a figure within the figure space to provide digitized figure data, including X and Y coordinate information for the figure;
storing the figure data in storage spaces of the figure data table; and
storing in those memory areas of the address data table corresponding with figure space cells through which the figure passes the addresses of the figure data table storage spaces in which the corresponding figure data is stored,
whereby, when the figure is modified, modifying the figure data, any additional figure data resulting from the modification can be stored in available storage spaces of the figure data table, with the addresses of those storage spaces within the figure data table that are storing the additional figure data stored in the memory areas of the address data table corresponding with the figure space cells having modified figure data, so that the address data table does not need to be entirely rearranged.

33. A method as claimed in claim 32, further comprising the steps of:
identifying cells within the figure space to be searched for a figure;
interrogating the memory areas of the address data table corresponding to the identified cells to obtain the addresses of the figure data table storage spaces in which the corresponding figure data is stored;
interrogating the figure data table storage spaces for which addresses were obtained to obtain the stored figure data; and
displaying the figure corresponding with the obtained figure data.

34. A figure storage method according to claim 32 further comprising storing in said corresponding memory area information indicative of overflow of data; identifying a second memory area having a predetermined relationship with said corresponding memory area; and storing in the second memory area surplus addresses from said corresponding memory area.

35. A figure storage method according to claim 34 wherein the predetermined relationship is defined by an address indicative of the second memory area, and said method further comprises storing the address of the second memory area in said corresponding memory area.

36. A figure storage system, for storing a representation of a figure presented within a figure space having Cartesian coordinates with an X abscissa and a Y ordinate from an origin and being divided in the X and Y directions into cells, the system comprising:
means defining a figure data table including a plurality of storage spaces, each storage space having an address;
means defining an address data table having a plurality of memory areas of fixed size, each memory area corresponding with one of the figure space cell;
means for digitizing a figure within the figure space to provide figure data including X and Y coordinate information for end points and node points of the figure within the figure space;
first storage means for storing the figure data in storage spaces of the figure data table; and
second storage means for storing, in the memory areas of the address data table corresponding with figure space cells having therein end points and node points of the digitized figure, the addresses of those storage spaces within the figure data table that are storing figure data for the digitized figure,
whereby, when the figure is modified, modifying the figure data, any additional figure data resulting from the modification can be stored in available storage spaces of the figure data table, with the addresses of those storage spaces within the figure data table that are storing the additional figure data stored in the memory areas of the address data table corresponding with the figure space cells having modified figure data, so that the address data table does not need to be entirely rearranged.

37. A figure storage system as claimed in claim 36 wherein:
said digitizing means further provides figure data including data identifying coordinates of portions of a figure passing through figure space cells; and
said second storage means further stores, in memory areas of the address data table corresponding with figure space cells through which the digitized figures passes, the addresses of those storage spaces within the figure data table that are storing the corresponding figure data for the digitized figure.

38. A figure storage system as claimed in claim 37 further comprising:
means for interrogating memory areas of the address data table corresponding with figure space cells having portions of the figure therein to obtain addresses of storage spaces within the figure data table that are storing figure data for the digitized figure;
means for interrogating storage spaces of the figure data table whose addresses are obtained from the interrogated address data table memory areas to obtain figure data for the digitized figure; and
means for displaying a figure formed from the figure data obtained from the interrogated figure data table storage areas.

39. A figure storage system as claimed in claim 36, further comprising:
means for interrogating memory areas of the address data table corresponding with figure space cells having therein end points and node points of the digitized figure to obtain addresses of storage spaces within the figure data table that are storing figure data for the digitized figure;

means for interrogating storage spaces of the figure data table whose addresses are obtained from the interrogated address data table memory areas to obtain coordinates of end points and node points of the digitized figure; and means for displaying a figure formed by joining the end points and node points whose coordinates are obtained from the interrogated figure data table storage areas.

40. A figure storage system, for storing a representation of a figure presented within a figure space having Cartesian coordinates with an X abscissa and a Y ordinate from an origin and being divided in the X and Y directions into cells, the system comprising:

means defining a figure data table including a plurality of storage spaces, each storage space having an address;

means defining an address data table having a plurality of memory areas of fixed size, each memory area corresponding with one of the figure space cells;

means for digitizing a figure within the figure space to provide digitized figure data for the figure;

means for storing the figure data in storage spaces of the figure data table; and means for storing, in those memory areas of the address data table cell corresponding with figure spaces cells through which the figure passes, the addresses of the figure data table storage spaces in which the corresponding figure data is stored, whereby, when the figure is modified, modifying the figure data, any additional figure data resulting from the modification can be stored in available storage spaces of the figure data table, with the addresses of those storage spaces within the figure data table that are storing the additional figure data stored in the memory areas of the address data table corresponding with the figure space cells having modified figure data, so that the address data table does not need to be entirely rearranged.

41. A system as claimed in claim 40, further comprising:

means for interrogating the memory areas of the address data table corresponding to figure spaces cells through which a figure passes to obtain the addresses of the figure data table storage spaces in which the corresponding figure data is stored;

means for interrogating the figure data table storage spaces for which addresses were obtained to obtain the stored figure data; and means for displaying the figure formed from the obtained figure data.

* * * * *